106. COMPOSITIONS, COATING OR PLASTIC

89 Patented Nov. 24, 1936

2,061,972

UNITED STATES PATENT OFFICE 2,061,972

HYDRAULIC CEMENT

Ellis W. Reed-Lewis, Windsor, Ontario, Canada

*chromium trioxide*

No Drawing. Application August 20, 1934,
Serial No. 740,722

1 Claim. (Cl. 106—25)

The invention relates to the manufacture and use of pulverous hydraulic cements and more particularly to those in which the major constituent is a clinker of essentially anhydrous composition. It is the primary object of the invention to obtain a product having improved characteristics including, first, a lessening of the total amount of heat liberated during the hardening of the cement; second, a lower velocity or rate of heat liberation; third, an acceleration in the reaction which imparts to the structure tensile strength; fourth, sulphate resistance, and fifth, waterproofness. To end the invention consists in the improved product and the process for forming the same as hereinafter set forth.

In the use of hydraulic cements of this general type, cementatory properties are developed through chemical reaction with water, a reaction which will hereinafter be referred to by the term "hydration", which will be understood to cover the processes both of direct hydration and of hydrolysis, wherever the latter may also be involved in the reaction under consideration. The hydration of hydraulic cements of this general type, proceeds at a velocity that is largely governed by the effective fineness to which the product has been ground in the process of its manufacture; it is also influenced by the nature and proportions of the various anhydrous mineral compounds of which the clinker may be composed. It follows that these factors of effective fineness and composition also govern the velocity at which the cementatory properties will be developed in the ultimate use of these cements. When this velocity is sufficiently high, the cement is commonly classified as a "high-early-strength-cement"; when the velocity is of a lower order, the cement is commonly classified as a "normal" or "ordinary" cement. To meet certain special uses, these factors of effective fineness and composition are occasionally adjusted to still further depress the velocity of hydration, the resulting cements being then classified as "slow-hardening" cements. This invention is applicable to the manufacture and use of hydraulic cements throughout the entire range of velocities of hydration. In the ultimate use of hydraulic cements of this general type, the process of hydration results in the liberation of substantial quantities of heat; this heat is commonly referred to as the "heat of hardening" of the cement; the velocity with which this heat is liberated, and also its total amount, are influenced by the same factors of effective fineness and composition that govern the velocity of the process of hydration. When the conditions of the ultimate use of a cement, and of its particular characteristics, are such that heat is liberated faster than it can be dissipated, by conduction and radiation; it follows that there will be a rise in the temperature of the concrete or mortar of which the cement is a component, and a consequent tendency to expansion in volume. As the liberation of heat subsides in velocity with progressive completion of the hydration process, it finally becomes less than the velocity of dissipation by conduction and radiation; there is then a consequent drop in the temperature of the concrete or mortar, and a resultant tendency to contraction in volume that may produce stresses which the current tensile strength of the concrete or mortar is incapable of resisting; shrinkage cracks would then occur which might ultimately extend and endanger the integrity of the structure. As above stated, it is a purpose of this invention to reduce the total amount of the heat of hardening of the cement to which it is applied; it is a further purpose of this invention to lower the velocity with which heat will be liberated under any given conditions of use; it is a third purpose of this invention to so accelerate the velocity with which the cement will impart tensile strength to concrete or mortar, that danger of the occurrence of shrinkage cracks through thermal contraction will be still further minimized.

Concretes and mortars in which cements of this general type are used, are frequently exposed to contact with various sulphate compounds, and other aggressive agents, in the presence of moisture. Sea water, and the so-called "alkali" ground waters, are examples of such exposures. Experience has amply shown that such exposure may ultimately result in serious deterioration or complete disintegration of even the most carefully fabricated concretes. Experience and investigation have also shown that certain constituents of the clinkers from which the cements are produced, are more susceptible to attack by these aggressive agents than are certain other constituents of the same clinkers; but that the latter more stable constituents are incapable of preserving the integrity of the concrete after the disruptive action of the aggressive agents on the susceptible constituents has brought the concrete to a condition of incipient failure. With more or less success, but with considerable uncertainty, and at considerable inconvenience and expense, attempts have been made to produce "sulphate-resisting cements", as a modification of this general type, for use in special cases of exposure. These attempts have been generally confined to making such alterations in the chemical composition of the clinker that the susceptible constituents will be present in reduced and, consequently, less dangerous proportions. It is a fourth purpose of this invention to so influence the susceptible constituents of the clinker, that they will be incapable of subsequently exerting any significant disruptive action on the concrete, even under severe exposure to sulphate action. This invention may therefore be applied to produce a truly sulphate-resisting cement from any clinker of normal composition; without the objectionable necessity of producing and segregating a special clinker of abnormal composition for the purpose.

Since no one of the products of the hydration of cements of this general type can be considered entirely immune to the solvent action of water under conditions where percolation is possible, it follows that all concretes or mortars that are to be exposed to any conditions inviting the percolation of moisture, should be of a character well designed to resist such percolation—in common parlance, such concrete or mortars should be "waterproof". The attainment of a satisfactory degree of waterproofness in concrete and mortar, involves not only care in their design, fabrication and placement, but also the inherent character of the cement used; for whatever degree of waterproofness is attained, is imparted solely by those products resulting from the hydration of the cement used. It is a fifth purpose of this invention to produce a cement that will facilitate the attainment of waterproof concrete and mortars.

Having thus described five of the major purposes of this invention, its character and the process of its application will now be disclosed in such detail that those skilled in the art of producing hydraulic cements of this general type will be enabled to attain the particular qualities resulting from a proper application of this invention. Amongst the various anhydrous mineral compounds generally believed to occur in cement clinker, tri-calcium aluminate is known to contribute the largest quantity of heat per unit of its occurrence, during the process of hydration, and to liberate this heat at a greater velocity than do the other mineral compounds present. The first and second purposes of this invention, as hereinbefore enumerated, are attained by a selective prehydration of all, or a substantial proportion of the tri-calcium aluminate present, at an appropriate intermediate stage in the grinding process of the cement. To accompolish this selective prehydration, there is incorporated with the water used for the purpose, an agent that facilitates the hydration of tri-calcium aluminate. The quantity of water, and the quantity of the selective agent, should obviously be influenced to some extent by the quantity of tri-calcium aluminate that it is desired should be prehydrated. A satisfactory reduction in the heat of hardening and in the velocity of its liberation, can usually be attained by the use of a two per cent aqueous solution of the selective agent, in the amount of 2½ pounds of solution to each 100 pounds of clinker treated. The ultimate in heat reduction by this means, however, would be attained by using approximately 40 pounds of solution for each 100 pounds of tri-calcium aluminate known to be present in the clinker to be treated. Since no known means of positively determining the actual amount of tri-calcium aluminate in a clinker exists at the present time, any attempt to attain a complete prehydration of this compound should be made with more caution than can usually be ensured in the commercial production of cement. The stage in the grinding process at which the application of the aqueous solution of the selective agent should be made to the clinker, should preferably be subsequent to the incorporation of gypsum with the clinker, and when the two have been ground together to a fineness of not less than 30% passing the #200 sieve; at least one stage of tube mill grinding should preferably follow the application of the solution to the clinker. As the solution is applied in proper proportions to the clinker, or immediately thereafter, a thorough mixing should occur, so that all of the clinker may be brought in contact with the solution. This mixing can be satisfactorily accomplished by passage through 30 feet or more of screw conveyor, or by other appropriate means. If the solution is applied to the clinker at the stage immediately prior to the final grinding stage in the production of a high early strength cement, it is preferable that the treated clinker should be stored in a tank or bin for at least three hours before the final stage of grinding is attempted. The specific selective agent which I preferably employ is chromium trioxide, but any other material having a similar selective action may be used as a substitute therefor.

In addition to its function as a selective prehydration agent, the presence of chromium trioxide introduced as above described, results in an acceleration of the velocity with which cement will impart both tensile and compressive strength to concretes and mortars, thus attaining the third purpose of this invention.

It is generally recognized by most investigators of the subject, that the first step in the disruptive action of sulphate solutions on concrete is the crystallization of the double salt, calcium sulpho aluminate. I have discovered that the presence of chromium trioxide introduced in the proportions hereinbefore mentioned inhibits the crystallization of this double salt under conditions otherwise known and observed to favor such crystallization. This observed inhibition is apparently brought about by the presence of the chromium trioxide causing calcium sulpho aluminate to form rapidly in a colloidal state, having no subsequent tendency to devitrify into a crystalline state in so far as time has yet permitted observations to continue. It will be seen therefore, that the use of chromium trioxide in the proportions hereinbefore mentioned, can be expected to result in the attainment of the fourth purpose of this invention.

In seeking to attain waterproof concrete or mortar, there are several factors of importance that are governed by inherent qualities of the cement used; one of these factors is the density of the hardened mass. Concretes and mortars are placed or moulded in a plastic condition, the density they attain up to the time of solidification is influenced to some extent by manipulation in placing, but also, and to an important extent, by the lubricating qualities of the cement used. I have discovered that with my improved cement a greater density can be attained, which in some cases is equivalent to a reduction of from 15% to 20% in pore or void space.

A further factor of importance in attaining waterproof concrete or mortar, is the physical nature of the products of the hydration of the cement, as they exist in the hardened mass. With cements of the general type under consideration, the products of hydration exist in the hardened mass of concrete or mortar, partly in a crystalline form, and partly in a colloidal, or glue-like form. As an obstruction to the percolation of water, it is obvious that the colloidal hydrates would be more effective than those which exist as isolated crystals. It may even be rationally assumed that in many instances, crystallization within the hardening mass may produce stresses resulting in cracks or fissures of an ultimate size that would facilitate the percolation of water through the mass. It would seem desirable, therefore, to influence the products of hydration towards assuming and retaining a colloidal, rather than a crystalline state. It is known that with cements of the general type under consideration, to the extent that calcium sulphate is available, calcium sulpho aluminate will be formed by combination with the available aluminates of the clinker; this combination occuring as a crystallization from solution in the early stages of the hardening processes, and being attended by expansive forces. It has already been shown that the use of chromium trioxide in the application of this invention has been found effective in facilitating the formation of colloidal calcium sulpho aluminate, and in inhibiting any subsequent devitrification of the same. It will be seen, therefore, that the fifth enumerated purpose of this invention is substantially attained both by ensuring a greater density of the concrete, and by promoting a more colloidal or glue-like condition in the hardened products of hydration.

To serve its function as an inhibiting agent towards the crystallization of calcium sulpho aluminate, it does not appear to be essential that the chromium trioxide be introduced during the manufacturing process of the cement as hereinbefore described; though this is considered to be the preferred method for its introduction, because of the other functions it also serves when so introduced. When this inhibiting action alone is required, it would appear that the chromium trioxide may well be introduced in any convenient manner; for example, it could be dissolved in suitable quantity in the water used in the mixing of the concrete or mortar.

While I have described only one specific agent for attaining all of the improved qualities of my cement, it is obvious that other agents might be used for the same purpose, and also that the different improved functions might be accomplished by different agents. I believe that I am the first to discover any means for the selective prehydration of the tri-calcium aluminate without detriment to other ingredients in the clinker. Also, I have discovered that the introduction of an agent which inhibits crystallation of calcium sulpho aluminate will render the cement sulphate resisting. Further, that an agent that will influence aluminates and sulphates to combine in a colloidal state, will be effective in waterproofing.

Finally, I have discovered that a combination of the foregoing functions, when accomplished by treatment at an intermediate stage in the grinding operation, will result in a cement capable of producing concretes and mortars of greater density.

What I claim as my invention is:

An hydraulic cement having chromium trioxide as an ingredient thereof.

ELLIS W. REED-LEWIS.